United States Patent Office 3,725,185
Patented Apr. 3, 1973

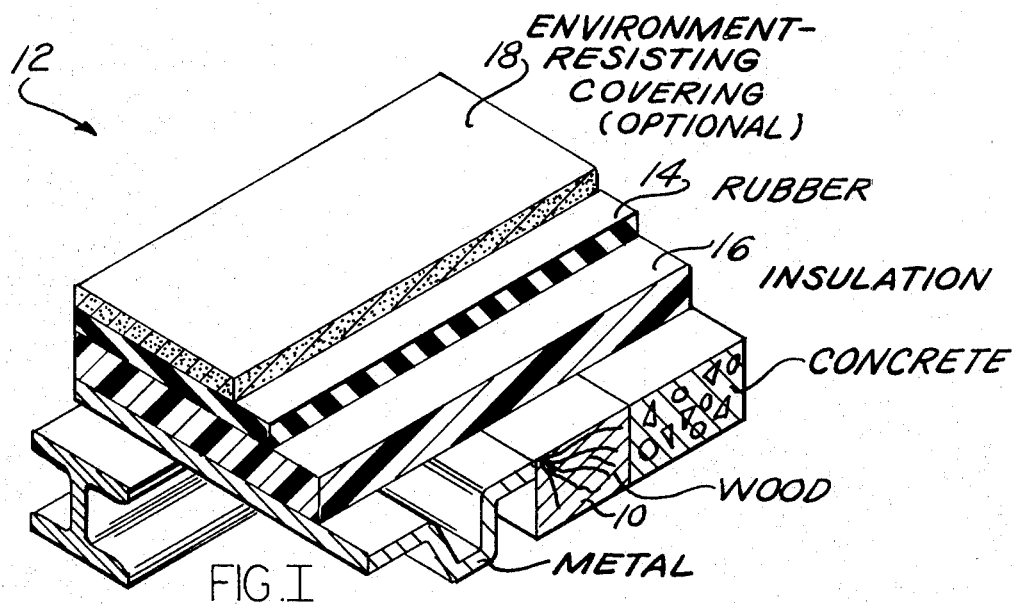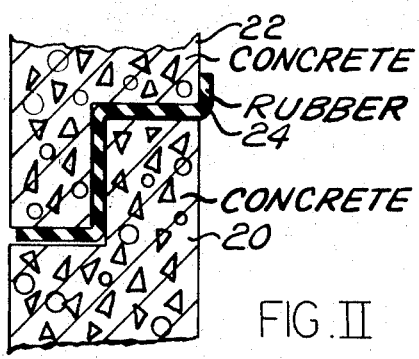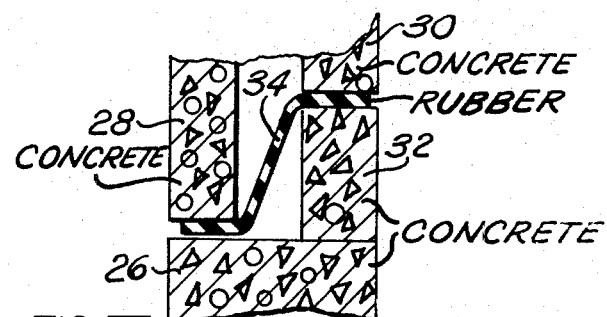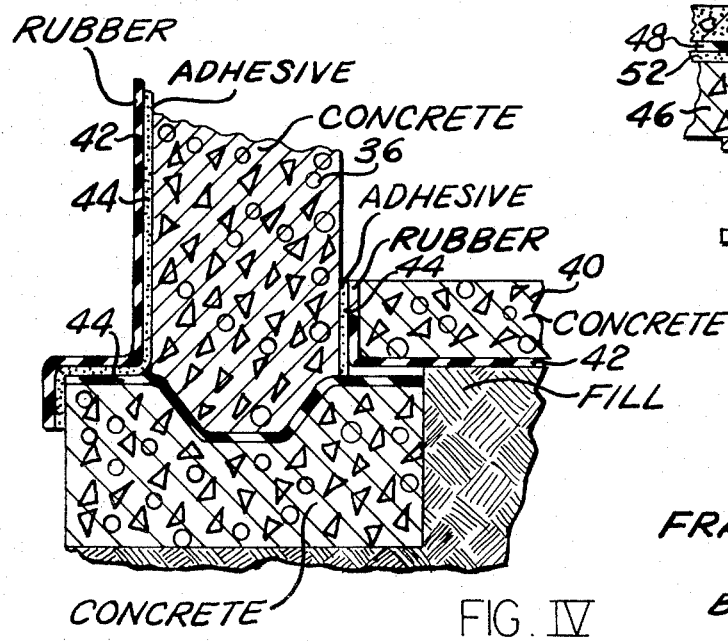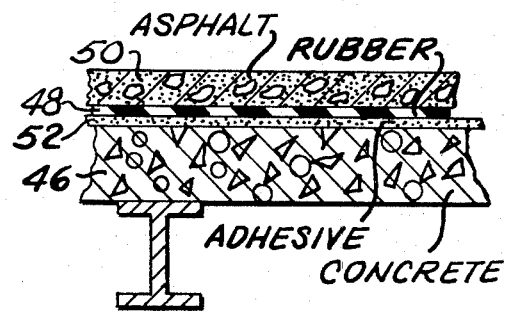

3,725,185
PROTECTED STRUCTURAL AND CONSTRUCTION MATERIALS
Frank W. Curtis, Chagrin Falls, Ohio, assignor to Lexsuco, Inc., Solon, Ohio
Filed July 16, 1970, Ser. No. 55,447
Int. Cl. B32b 25/10
U.S. Cl. 161—89
10 Claims

ABSTRACT OF THE DISCLOSURE

In various protective assemblies or systems for structural and construction materials, a water resistant sheet having a thickness within the range of about 1/100 to about 3/8 inch and being composed of from 50 to 100 wt. percent uncured rubber reclaim, and from 0 to about 50 wt. percent bituminous material.

Specific protective assemblies or systems are described and claimed.

---

This invention relates to the structural and construction materials art and more particularly to an improvement in protected structural and construction materials.

Depending upon the service demands imposed upon a structural or construction member, it may require protection against water penetration in liquid or vapor form and protection against the ravages of the environment to which it is exposed.

For example, structural and constructional members used in roofing applications will require protection against water penetration and deterioration by exposure to weather. Structural members forming parking decks, podium decks and promenade decks as well as other structural members requiring waterproofing and/or concealed flashings, will have joints requiring protection against water penetration. Construction and structural members serving below grade, such as in tunnels, foundations and the like, will require protection against deterioration from exposure to soil as well as protection against water penetration.

Heretofore in roofing applications, protection against water penetration and deterioration by exposure to weather has been achieved principally by using a laminate consisting of alternate layers of bituminized felt and bitumen. For purposes of this disclosure the terms "bitumen" and "bituminous" are intended to embrace petroleum derived (asphaltic) and coal tar derived (pitches) hydrocarbonaceous materials. These materials, and principally coal tar pitch, are also used for protection against water penetration in below grade applications and traffic decks. In roofing, waterproofing and built-up laminate of bituminized felt and bitumen have usually been effective when installed properly. But the bituminized felts can absorb water and when they are not applied correctly and become exposed to water and water vapor, this can cause deterioration, delamination, blistering, cracking, etc., of the roof.

Other materials in sheet form such as polyvinyl chloride, neoprene, butyl, ethylene propylene rubber, polyethylene and various laminates of these materials have been used to some extent for waterproofing and concealed flashing applications. Whereas, these materials have shown merit, they are generally more expensive than bituminous materials. Further, some difficulty has been experienced in developing satisfactory systems for adhesively securing these sheet materials to various substrates.

I have found in each of the foregoing applications, as well as others, where protection against water penetration is required for structural and construction members, that the presently used materials can be replaced with a water resistant sheet material composed of from about 50 to 100 weight percent uncured rubber reclaim having a rubber hydrocarbon content of at least about 25 weight percent, and from 0 to about 50 weight percent of a bituminous material. The sheet material may be backed with an organic or inorganic membrane in sheet, non-woven or woven form. Although the bituminous ingredient and the backing are not essential features they can, in many instances, enhance the performance of the rubber reclaim sheet.

This sheet material with joined laps may be used alone, where only protection against water penetration is required; or it may be used with a bituminous or comparable organic adhesive where protection against water penetration and/or exposure to weather is required; or it may be used in combination with conventional insulative substrates such as wood, structural wood fiber, glass fiber, expanded perlite, foamed glass, polyurethane foam, concrete, lightweight concrete and gypsum, and environment resistant materials such as a bituminous or comparable organic adhesive.

The uncured rubber reclaim sheet material has the additional advantage of being low cost since it is made principally from scrap materials, i.e., old tires, inner tubes, belting, etc., which are available as surplus waste materials. The uniqueness of this invention is further exemplified by the fact that the uncured rubber reclaim sheet material will provide a much needed end use for old tires which have become a burdensome waste and pollution problem. Another advantage of the uncured rubber reclaim sheet material is that it is easy to install in roll form with conventional hardware and installation procedures. A single layer of suitable thickness of uncured rubber reclaim sheet secured to a structural or construction member with a bituminous or comparable organic adhesive will suffice for purposes of protection against water penetration. Another advantage is that the sheet material is essentially waterproof and will maintain water protection from rain or snow during job storage and installation.

Therefore, in accordance with one aspect of the present invention there is provided a protective assembly for structural and construction materials comprising a water resistant sheet having a proximal surface cooperatively associated with an insulative substrate, the water resistant sheet having a thickness within the range of about 1/100 to about 3/8 inch and being composed of about 50 to 100 weight percent uncured rubber reclaim, and from 0 to about 50 weight percent bituminous material.

In accordance with another aspect of the present invention there is provided a protective assembly for structural and construction materials comprising a water resistant sheet having a proximal surface cooperatively associated with an insulative substrate and a distal surface cooperatively associated with an envorinment-resisting covering, the water resistant sheet having a thickness within the range of about 1/100 to about 3/8 inch and being composed of about 50 to 100 weight percent uncured rubber reclaim, and from 0 to about 50 weight percent bituminous material.

In accordance with another aspect of the present invention there is provided in a structural joint comprising at least two structural elements separated by a water resistant material, the improvement wherein the water resistant material is a sheet having a thickness within the range of about 1/100 to about 3/8 inch and being composed of from about 50 to 100 weight percent uncured rubber reclaim, and from 0 to about 50 weight percent bituminous material.

In accordance with another aspect of the present invention there is provided a structural or construction member having secured thereto a protective membrane system comprising a water resistant sheet having a thickness within the range of about 1/100 to 3/8 inch and being composed of from about 50 to 100 weight percent uncured rubber reclaim, and from 0 to about 50 weight percent bituminous material.

It is, therefore, an object of the invention to provide an improvement in protected structural and construction materials.

Another object of the invention is to provide a protective assembly for structural and construction materials which comprises a water resistant sheet on top of an insulative substrate, in which the water resistant sheet is composed principally of uncured rubber reclaim.

Another object of the invention is to provide a protective assembly for structural and construction materials which comprises a water resistant sheet sandwiched between an insulative substrate and an environment-resistant covering, in which the water resistant sheet is composed principally of uncured rubber reclaim.

A further object of the invention is to provide in a structural joint comprising at least two structural elements, a water resistant separator in the form of a sheet, composed principally of uncured rubber reclaim.

Still another object of the invention is to provide a structural or construction member with a protection membrane system comprising a water resistant sheet composed principally of uncured rubber reclaim.

These and other objects and advantages will become apparent from the following detailed description of the invention when taken in conjunction with the accompanying drawings, in which:

FIG. I is a schematic perspective view with parts in section of a protective assembly in accordance with the invention, applied to a roof deck;

FIG. II is a schematic section vie wof a structural joint protected in accordance with an embodiment of the present invention;

FIG. III is a schematic section view of a structural joint and cavity protected in accordance with an embodiment of the present invention;

FIG. IV is a schematic section view of a structural member protected below grade with a membrane system in accordance with the present invention; and FIG. V is a schematic section view of a structural member below a traffic or covering surface and protected with a membrane system in accordance with the present invention.

The term "reclaimed rubber," as the term is generally known by those skilled in the art, refers to the product resulting from the treatment of vulcanized scrap rubber (contained, for instance, in scrap rubber tires and tubes and other miscellaneous waste rubber articles) by the application of mechanical mastication, heat or chemical agents, or a combination of such treatments, whereby a substantial devulcanization or regeneration of the rubber compound to a plastic vulcanizable state is effected. Reclaiming is recognized by those skilled in the art to be essentially a depolymerization process whereby the molecular weight of the rubber hydrocarbon molecules in the scrap is reduced as a result of the scission of rubber molecule chains with the formation of additional unsaturated bonds. Thus, the reclaimed rubber is an unsaturated material capable of being compounded, processed and further vulcanized into new and useful products. In the present invention the reclaimed rubber is used in its regenerated condition without effecting a further vulcanization of the devulcanized rubber, and the term "uncured rubber reclaim" when used herein is intended and will be understood to mean the devulcanized rubber reclaim product which has not undergone any significant vulcanization after having been regenerated.

A number of processes for reclaiming vulcanized scrap rubber are well known to the prior art. These include the digester method, heater method, high pressure steam, Lancaster-Banbury, and reclaimator. Of these, the digester method is most widely used, and though it forms no part of the present invention, this method will be described briefly since the steps practiced by the prior art may be deviated from to accommodate the needs of the present invention.

In the first step of the digester method scrap tires are ground up and the wire beads removed magnetically. Thereafter, the ground scrap is subjected to a digestion or devulcanization process by exposure to steam at 370 to 450° F. for from 5 to 24 hours.

When practiced by the prior art fiber digesting chemicals e.g., caustic soda, zinc chloride and calcium chloride are added in this step. These chemicals are preferably omitted when making reclaimed rubber for use in the present invention since the fibers act as a filler and tend to have a reinforcing effect on the reclaimed sheet.

The devulcanized product is then dewatered, dried and blended with reinforcing and processing agents such as clay, carbon black, asphalt and the like. The product is then subjected to refining and is then rolled out into sheets of desired thickness.

When using reclaimed rubber in accordance with the teachings of the prior art to produce sheet, extruded or molded products, it is generally common practice to add accelerators and vulcanizing agents during the compounding operation, looking toward eventual revulcanization of the rubber. This is unnecessary where the reclaimed rubber is to be used in the practice of the present invention, since the uncured rubber reclaim is not revulcanized.

If desired, the rubber reclaim sheet may be modified by the addition of a backing or reinforcement. Such reinforcement would be in addition to any tire cord fibers which may be present in the reclaimed rubber.

The backing or reinforcement may be in sheet, nonwoven or woven form and may be bonded to the reclaimed rubber sheet when the latter is rolled out following the refining operation.

Organic or inorganic fibers may be used for backing or reinforcement purposes. Suitable organic fibers include nylon and polyester, while suitable inorganic fibers include glass, mineral wool and asbestos. The backing may be applied to one or both sides of the rubber sheet.

The reclaimed rubber sheet described above has satisfactory weather resistant properties for many environments. If desired, however, the reclaimed rubber may be modified by the incorporation of up to 50 weight percent of a material known to have excellent weather resistant properties, such as asphalt, coal tar pitch or the like. Sheet modified in this manner will have improved weather resistant properties and extended life. Other modifiers or fillers may also be incorporated, such as new natural or synthetic rubber.

Referring now to the drawings where the showings are for purposes of illustrating preferred embodiments of the invention only, and not for the purpose of limiting the same, FIG. I shows roof deck 10 which may be formed of metal, wood, concrete or other construction or structural material, provided with a protective assembly designated generally as 12, comprising water resistant sheet 14 having a proximal surface cooperatively associated with an insulative substrate 16, and a distal surface cooperatively associated with an optional environment-resistant covering 18.

Water resistant sheet 14 is formed from uncured rubber reclaim sheet produced in accordance with the practice described hereinabove. The sheet may have a thickness within the range of about 1/100 to about 3/8 of an inch.

Insulative substrate 16 may be formed from a variety of natural and synthetic inorganic and organic materials such as cane, wood fibers or cork; inorganic fibers such as glass fibers and mineral wool; inorganic materials such as vermiculite, perlite, and cellular glass; foamed synthetic organic resins such as a polyurethane foam; and foamed inorganic material such as foamed cementitious materials. For purposes of illustration, it is shown as a fibrous material.

Roof deck 10 and insulative substrate 16 may be one and the same material such as concrete, lightweight concrete, gypsum, structural wood fiber and wood.

Environment-resisting cover 18 is formed of a weather resistant material such as an asphaltic or a coal tar pitch. These materials may be hot mopped on the rubber, or applied cold. Where necessary, the environment-resisting covering may be treated with gravel or other particulate material to provide a tack-free traffic surface. The environment-resisting covering may also be a thin layer of a weather resistant elastomer or plastic in part or full such as neoprene, Hypalon (Du Pont trademark for a chloro-sulfonated polyethylene), butyl rubber, ethylene propylene rubber, polyvinyl chloride, epoxy, urethane or silicone.

FIG. II shows a structural joint comprising foundation member 20 and elevated member 22 separated by water resistant sheet material 24 formed of uncured rubber reclaim described above. Sheet 24 may be installed between members 20, 22 without the use of an adhesive, or the sheet may be adhesively secured to one or both of the structural members.

FIG. III shows joints formed between structural foundation member 26 and elevated structural member 28; and between elevated structural members 30, 32. These members as illustrated are formed of concrete. Each of these joints is separated by water resistant sheet material 34, which is formed from uncured rubber reclaim manufactured in the manner described hereinabove. It should also be noted that water resistant sheet material 34 serves as a concealed flashing across the cavity formed between the walls defined by members 28, and 30, 32.

FIG. IV illustrates structural members, 36 (wall), 38 (footer) and 40 (floor) protected by a membrane system comprising water resistant sheet 42. The structural members as illustrated are formed of concrete, but it will be appreciated that other materials, such as brick, structural block or stone, may also be used. The water resistant sheet 42 is formed of uncured rubber reclaim prepared in accordance with the practices described above. When used to protect a vertical surface, sheet 42 is preferably secured to structural member 36 by the use of an adhesive 44 which may take the form of asphalt, coal tar pitch or a rubber or synthetic adhesive.

FIG. V illustrates a structural member 46 which may be formed from concrete, as illustrated, protected by a membrane system comprising water resistant sheet 48 above which is a traffic or covering surface 50, for example a bituminous material. The water resistant sheet 48 is formed of uncured rubber reclaim prepared in accordance with the practices described above. Sheet 48 may be secured to structural member 46 by the use of an adhesive 52 which may take the form of asphalt, coal tar pitch or a rubber or synthetic adhesive.

The present invention has been described in conjunction with certain structural embodiments; however, it is to be appreciated that various structural changes may be made in the illustrated embodiments without departing from the intended scope and spirit of the present invention.

Having thus described my invention, I claim:

1. A protective assembly for structural and construction materials comprising a water resistant sheet having a proximal surface cooperatively associated with an insulative substrate, said water resistant sheet having a thickness within the range of about $1/100$ to about $3/8$ inch and being composed of from 50 to 100 weight percent of a plastic, devulcanized scrap rubber; and from 0 to about 50 weight percent bituminous material.

2. A protective assembly for structural and construction materials comprising a water resistant sheet having a proximal surface cooperatively associated with an insulative substrate and a distal surface cooperatively associated with an environment-resisting covering, said water resistant sheet having a thickness within the range of about $1/100$ to about $3/8$ inch and being composed of from 50 to 100 weight percent of a plastic, devulcanized scrap rubber; and from 0 to about 50 weight percent bituminous material.

3. The assembly as defined in claim 2 wherein said water resistant sheet is provided with fibrous reinforcement consisting of an open weave fabric backing formed of fibers selected from the group consisting of organic and inorganic fibers.

4. The assembly as defined in claim 1 wherein said insulative substrate is in the nature of a board formed principally of a material selected from the group consisting of cane and wood fibers, cork, inorganic fibers, perlite, vermiculite, cellular glass, foamed synthetic organic resins and foamed cementitious materials.

5. The assembly as defined in claim 2 wherein said environment-resisting covering is a bituminized material.

6. The assembly as defined in claim 1 wherein said water resistant sheet is secured to said insulative substrate with an adhesive.

7. In a structural joint comprising at least two structural elements separated by a water resistant material, the improvement wherein said water resistant material is a sheet having a thickness within the range of about $1/100$ to about $3/8$ inch and being composed of from about 50 to 100 weight percent of a plastic, devulcanized scrap rubber; and from 0 to 50 weight percent bituminous material.

8. A structural or construction member having secured thereto a protective membrane system comprising a water resistant sheet having a thickness within the range of about $1/100$ to $3/8$ inch and being composed of from about 50 to 100 weight percent of a plastic, devulcanized scrap rubber; and from 0 to about 50 weight percent bituminous material.

9. The structure defined in claim 8 wherein said member is formed of a material having insulative properties.

10. The structure as claimed in claim 8 wherein said sheet is provided with fibrous, reinforcing backing on both sides.

References Cited

UNITED STATES PATENTS

| | | | |
|---|---|---|---|
| 3,253,521 | 5/1966 | Endres | 94—23 |
| 2,853,742 | 9/1958 | Dasher | 260—28.5 |
| 3,466,222 | 9/1969 | Curtis | 52—309 |
| 3,115,533 | 12/1963 | Wiseblood | 260—28.5 |
| 3,475,260 | 10/1969 | Stohes | 161—167 |
| 3,236,015 | 2/1966 | Rubenstein | 52—309 |

WILLIAM A. POWELL, Primary Examiner

J. J. BELL, Assistant Examiner

U.S. Cl. X.R.

52—309; 161—92, 93, 151, 160